United States Patent
Goel et al.

(10) Patent No.: US 12,218,825 B2
(45) Date of Patent: Feb. 4, 2025

(54) METHODS, SYSTEMS, AND COMPUTER READABLE MEDIA FOR RESTRICTING A NUMBER OF HOPS CONDUCTED IN A COMMUNICATIONS NETWORK

(71) Applicant: Oracle International Corporation, Redwood Shores, CA (US)

(72) Inventors: Yesh Goel, Bangalore (IN); John Nirmal Mohan Raj, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 408 days.

(21) Appl. No.: 17/539,724

(22) Filed: Dec. 1, 2021

(65) Prior Publication Data

US 2023/0171182 A1    Jun. 1, 2023

(51) Int. Cl.
*H04L 45/00* (2022.01)
*H04L 67/02* (2022.01)
(Continued)

(52) U.S. Cl.
CPC .............. *H04L 45/20* (2013.01); *H04L 67/02* (2013.01); *H04L 67/51* (2022.05); *H04L 67/56* (2022.05); *H04L 67/566* (2022.05)

(58) Field of Classification Search
CPC ....... H04L 45/20; H04L 67/02; H04L 67/566; H04L 67/51; H04L 67/563; H04L 67/56
See application file for complete search history.

(56) References Cited

U.S. PATENT DOCUMENTS 11,206,207 B1 * 12/2021 Deb ................ H04L 45/16
11,784,762 B2   10/2023 Jayaramachar et al.
(Continued)

FOREIGN PATENT DOCUMENTS

WO    WO 2023/101818 A1    6/2023

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

(Continued)

*Primary Examiner* — Omer S Mian
(74) *Attorney, Agent, or Firm* — Jenkins, Taylor & Hunt, P.A.

(57) ABSTRACT

Methods, systems, and computer readable media for restricting a number of hops conducted in a communications network are disclosed. One method includes receiving, by a hypertext transfer protocol (HTTP) proxy element in a first network region, a service request message including a header section that specifies a maximum number of hops value and conducting a search for a producer network function (NF) in the first network region to provide a network service requested in the service request message. The method further includes determining the maximum number of hops value in the header section of the service request message if the HTTP proxy element is unable to locate the producer NF in the first network region, reducing the maximum number of hops value in the header section of the service request message by one to derive an updated maximum number of hops value if the HTTP proxy element determines that the maximum number of hops value in the header section is greater than zero, and directing the service request message containing the updated maximum number (Continued)

of hops value to a second HTTP proxy element located in a second network region.

17 Claims, 5 Drawing Sheets

(51) Int. Cl.
*H04L 67/51* (2022.01)
*H04L 67/56* (2022.01)
*H04L 67/566* (2022.01)

(56) References Cited

U.S. PATENT DOCUMENTS

| | | | |
|---|---|---|---|
| 2008/0137830 | A1 | 6/2008 | Bhogal et al. |
| 2012/0163165 | A1 | 6/2012 | Ra et al. |
| 2020/0252426 | A1 | 8/2020 | Lee |
| 2021/0083965 | A1 | 3/2021 | Taft et al. |
| 2021/0281567 | A1 | 9/2021 | Arai |
| 2022/0124162 | A1* | 4/2022 | Zhang .................. H04W 24/02 |
| 2023/0143400 | A1 | 5/2023 | Jayaramachar et al. |
| 2024/0031276 | A1* | 1/2024 | Jiménez ................ H04L 45/122 |

OTHER PUBLICATIONS

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

"5G; 5G System; Technical Realization of Service Based Architecture; Stage 3 (3GPP TS 29.500 version 16.5.0 Release 16)," ETSI TS 129 500, V16.5.0, pp. 1-86 (Nov. 2020).

Nappa, et al., "RevProbe: Detecting Silent Reverse Proxies in Malicious Server Infrastructures", ASAC, pp. 101-112 (2016).

"3rd Generation Partnership Project; Technical Specification Group Core Network and Terminals; 5G System; Technical Realization of Service Based Architecture; Stage 3 (Release 17)" 3GPP TS 29.500, V17.1.0 (Dec. 2020).

Notification of the Transmittal of the International Search Report and Written Opinion of the International Searching Authority, or the Declaration for International Patent Application No. PCT/US2022/050170 (Apr. 28, 2023).

Notice of Allowance and Fees for due for U.S. Appl. No. 17/524,703 (Aug. 16, 2023).

Advisory Action for U.S. Appl. No. 17/524,703 (Jun. 27, 2023).

Final Office Action for U.S. Appl. No. 17/524,703 (Apr. 11, 2023).

Non-Final Office Action for U.S. Appl. No. 17/524,703 (Dec. 23, 2022).

"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).

"3rd Generation Partnership Project; Technical Specification Group Core Network and Terminals; 5G System; Network Function Repository Services; Stage 3 (Release 17)," 3GPP TS. 29.510, V17.2.0, pp. 1-256 (Jun. 2021).

"3rd Generation Partnership Project; Technical Specification Group Core Network and Terminals; 5G System; Technical Realization of Service Based Architecture; Stage 3 (Release 17)," 3GPP TS 29.500, V17.3.0, pp. 1-108 (Jun. 2021).

"3rd Generation Partnership Project; Technical Specification Group Core Network and Terminals; 5G System; Public Land Mobile Network (PLMN) Interconnection; Stage 3 (Release 17)," 3GPP TS 29.573, V17.1.0, pp. 1-102 (Jun. 2021).

Commonly-Assigned, co-pending U.S. Appl. No. 17/524,703 for "Methods, Systems, and Computer Readable Media for Limiting Network Function (NF) Repository Function (NRF) Forwarding," (Unpublished, Nov. 11, 2021).

* cited by examiner

METHODS, SYSTEMS, AND COMPUTER READABLE MEDIA FOR RESTRICTING A NUMBER OF HOPS CONDUCTED IN A COMMUNICATIONS NETWORK

TECHNICAL FIELD

The subject matter described herein relates to controlling a number of hops a service based interface (SBI) message is able to take via hypertext transfer protocol (HTTP) proxy elements in fifth generation (5G) communications networks and previous generation communications networks. More particularly, the subject matter described herein relates to methods, systems, and computer readable media for restricting a number of hops conducted in a communications network.

BACKGROUND

In telecommunications networks, a service endpoint is an address on a network node that uniquely identifies an entity that provides service to service consumers. The service endpoint can include an Internet protocol (IP) address or a combination of IP address and transport layer port number, which is also referred to as an IP endpoint.

In fifth generation (5G) telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints. Producer NFs register with a network function repository function (NRF). The NRF maintains an NF profile of available NF instances and their supported services. Consumer NFs can subscribe to receive information about producer NF instances that have registered with the NRF. Once registered, NF instances in the 5G network may establish sessions with one or more network exposure functions (NEFs). Notably, the NEF is a Third Generation Partnership Project (3GPP) network function that provides a means to securely expose the services and capabilities provided by producer network functions servicing the network.

At present, the 3GPP specification defines that service based interface messages can traverse HTTP proxy servers based on deployment. However, there is no limit on the number of HTTP proxy servers that the SBI message (i.e., SBI packets) can traverse in an attempt to arrive at a destination producer NF. While the 3GPP specifications do define certain timers that can be utilized to define the amount of time during which an SBI message should arrive at a producer NF, these timer mechanisms do not limit the number of hops that can be taken by the SBI messages before or after the expiration of the aforementioned timers. As such, an unnecessary amount of network traffic can still be generated and/or routed even though the SBI message has already timed out.

Accordingly, there exists a need for improved methods and systems for restricting a number of hops conducted in a communications network.

SUMMARY

Methods, systems, and computer readable media for restricting a number of hops conducted in a communications network are disclosed. One method includes receiving, by a hypertext transfer protocol (HTTP) proxy element in a first network region, a service request message including a header section that specifies a maximum number of hops value and conducting a search for a producer network function (NF) in the first network region to provide a network service requested in the service request message. The method further includes determining the maximum number of hops value in the header section of the service request message if the HTTP proxy element is unable to locate the producer NF in the first network region, reducing the maximum number of hops value in the header section of the service request message by one to derive an updated maximum number of hops value if the HTTP proxy element determines that the maximum number of hops value in the header section is greater than zero, and directing the service request message containing the updated maximum number of hops value to a second HTTP proxy element located in a second network region.

According to another aspect of the method described herein, the service request message is a service based interface (SBI) message.

According to another aspect of the method described herein, the maximum number of hops value is initially established in the service request message by a consumer NF or established via a predefined default value.

According to another aspect of the method described herein, the service request message is prevented from being forwarded to the second HTTP proxy element in the second network region if the maximum number of hops value in the header section of the service request message is determined to be zero.

According to another aspect of the method described herein, the HTTP proxy device is a security edge protection proxy (SEPP) or a service communication proxy (SCP).

According to another aspect of the method described herein, the HTTP proxy element is configured to increase the maximum number of hops value in the header section or the updated maximum number of hops value in the header section.

According to another aspect of the method described herein, each of the first network region and the second network region is a geographically defined region.

According to another embodiment described herein, a system comprising a HTTP proxy element including at least one processor and a memory, and a hop management module (HMM) implemented by the at least one processor configured for receiving a service request message including a header section that specifies a maximum number of hops value, conducting a search for a producer NF in the first network region to provide a network service requested in the service request message, and determining the maximum number of hops value in the header section of the service request message if the HTTP proxy element is unable to locate the producer NF in the first network region. The HMM is further configured for reducing the maximum number of hops value in the header section of the service request message by one to derive an updated maximum number of hops value if the HTTP proxy element determines that the maximum number of hops value in the header section is greater than zero, and directing the service request message containing the updated maximum number of hops value to a second HTTP proxy device located in a second network region.

According to another aspect of the system described herein, the service request message is a service based interface (SBI) message.

According to another aspect of the system described herein, the maximum number of hops value is initially established in the service request message by a consumer NF or established via a predefined default value.

According to another aspect of the system described herein, the service request message is prevented from being forwarded to the second HTTP proxy element in the second network region if the maximum number of hops value in the header section of the service request message is determined to be zero.

According to another aspect of the system described herein, the HTTP proxy device is a security edge protection proxy (SEPP) or a service communication proxy (SCP).

According to another aspect of the system described herein, the HTTP proxy element is configured to increase the maximum number of hops value in the header section or the updated maximum number of hops value in the custom section.

According to another aspect of the system described herein, each of the first network region and the second network region is a geographically defined region.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using one or more computer readable media having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for restricting a number of hops conducted in a communications network. In particular, the disclosed subject matter includes a method and system for introducing a maximum hop parameter in the packet header of an underlying HTTP protocol message. In some embodiments, the disclosed subject matter can utilize either a conventional header or a custom header to restrict the number of hops communicated among the HTTP proxy devices that are respectively located in a plurality of service regions (e.g., separate PLMNs, separate countries, separate datacenters, or any other separate geographic site locations). However, utilization of a custom header with the hop restriction feature (e.g., "X-number-of-hops") poses a challenge since several network entities may not be able to initially recognize or parse a custom header. For example, a Max-Forwards custom header is defined for TRACE and OPTIONS methods only.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
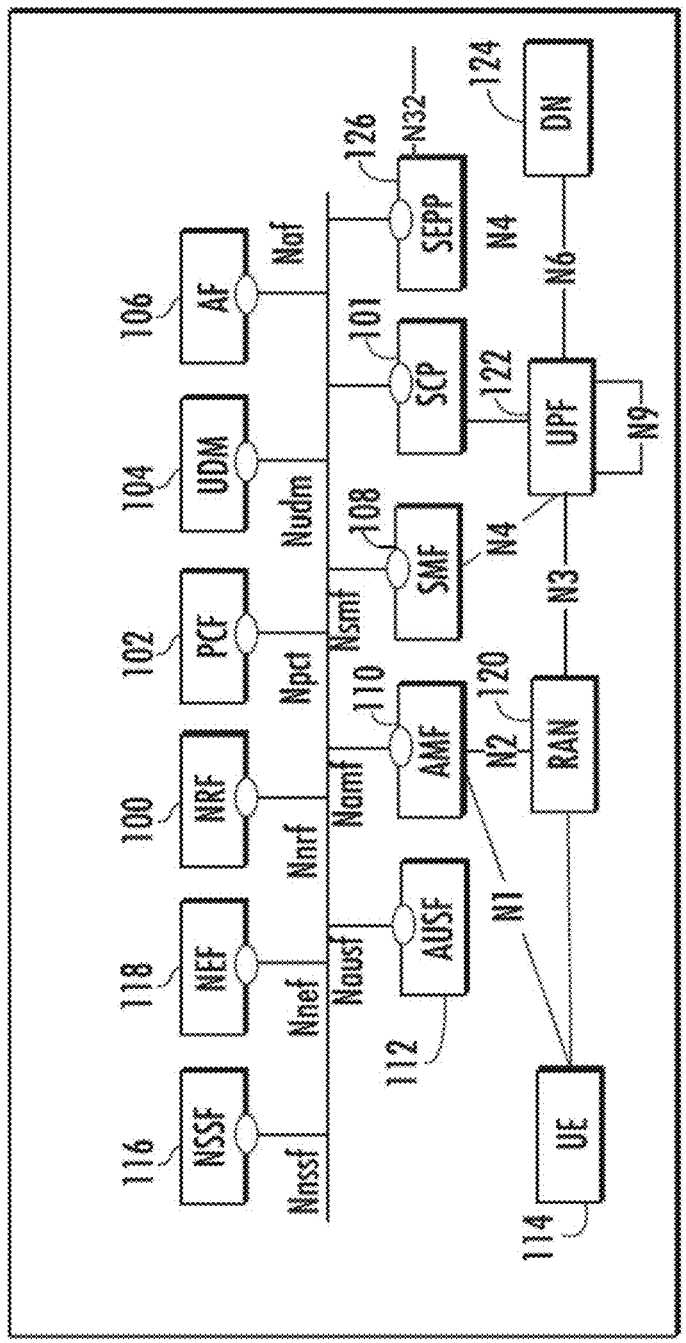
FIG. 1 is a network diagram illustrating an example fifth generation (5G) network architecture.

FIG. 1 is a block diagram illustrating an example 5G system network architecture, e.g., a home 5G core (5GC) network. The architecture in FIG. 1 includes an NRF 100 and an SCP 101, which may be located in the same home public land mobile network (PLMN). As described above, NRF 100 may maintain profiles of available producer NF service instances and their supported services and allow consumer NFs or SCPs to subscribe to and be notified of the registration of new/updated NF service instances. SCP 101 may also support service discovery and selection of NF instances. SCP 101 may perform load balancing of connections between consumer and producer NFs. In addition, using the methodologies described herein, SCP 101 may perform preferred NF location based selection and routing.

NRF 100 is a repository for NF or service profiles of NF instances. In order to communicate with a NF instance, a consumer NF or an SCP must obtain the NF service profile or the NF instance from NRF 100. The NF or service profile is a JavaScript object notation (JSON) data structure defined in 3GPP Technical Specification (TS) 29.510. The NF or service profile definition includes at least one of a fully qualified domain name (FQDN), an Internet protocol (IP) version 4 (IPv4) address, or an IP version 6 (IPv6) address.

In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC requests) between a consumer NF and a producer NF after applying application level security protection.

Figure 2:
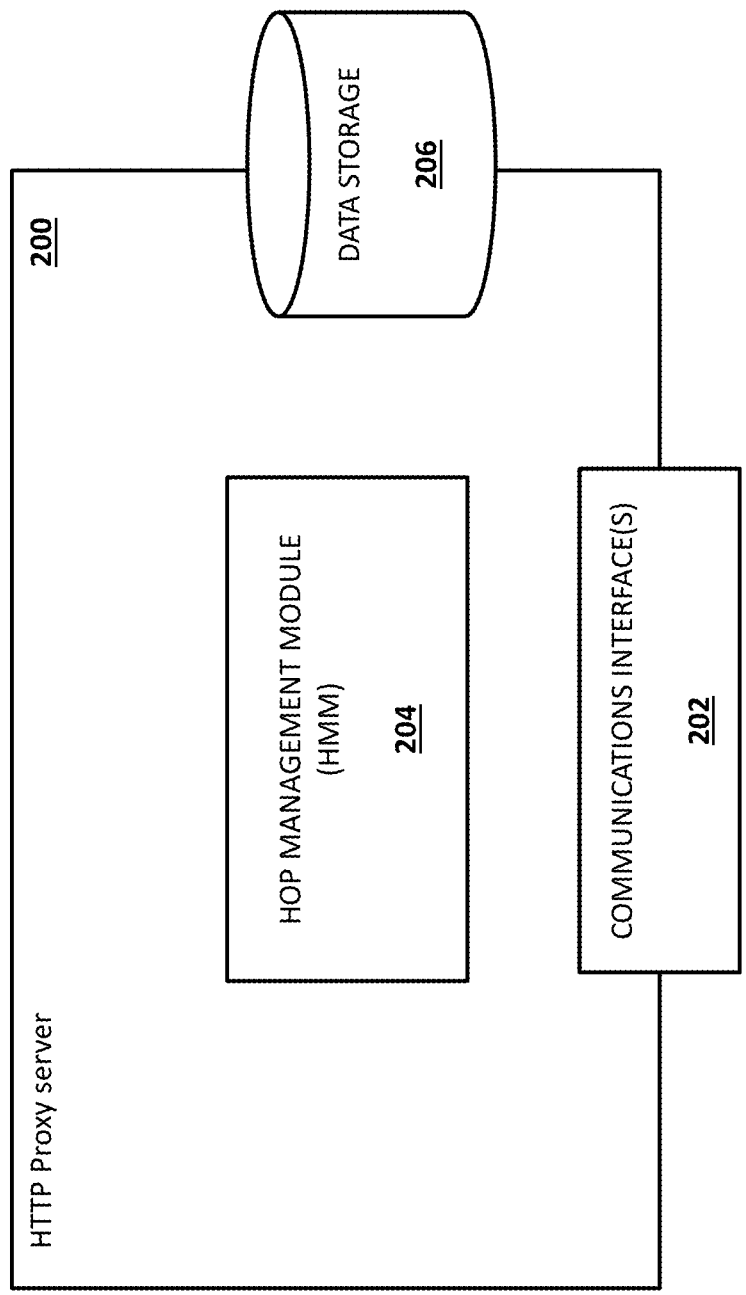
FIG. 2 is a block diagram illustrating an example hypertext transfer protocol (HTTP) proxy element for supporting the hop restriction functionality of SMI messages according to an embodiment of the subject matter described herein.

FIG. 2 is a diagram illustrating an example network node for restricting a number of hops conducted in a communications network. For example, an example HTTP proxy element 200 may represent any suitable entity or entities (e.g., one or more node(s), device(s), server(s), or computing platform(s)) for performing various aspects associated with facilitating the restriction of the number of hops for communicated SBI messages (i.e., one or more SBI packets). In some embodiments, HTTP proxy element 200 may represent or include one or more network elements, such as a service communication proxy (SCP) or security edge protection proxy (SEPP). For example, HTTP proxy element 200 may represent or include an authorization server, a network gateway, a network proxy, an edge security device, an exposure function, or other functionality.

Referring to FIG. 2, HTTP proxy element 200 may include one or more communications interface(s) 202 for communicating messages via a communications environment, e.g., one or more 5G networks (or 4G networks). For example, communications interface(s) 202 may include one or more communication interfaces for communicating with various network entities such as other HTTP proxy servers present in a home network (e.g., home public land mobile network (H-PLMN)), other visited networks (e.g., a visited public land mobile network (V-PLMN)), and/or other geographical regions.

In some embodiments, HTTP proxy element 200 may include a hop management module (HMM) 204. HMM 204 may be any suitable entity (e.g., software stored in memory and executing on at least one processor) for performing one or more aspects associated with the management and execution of restricting the number of hops in which SBI messages can be forwarded to other HTTP proxy servers.

Figure 3:
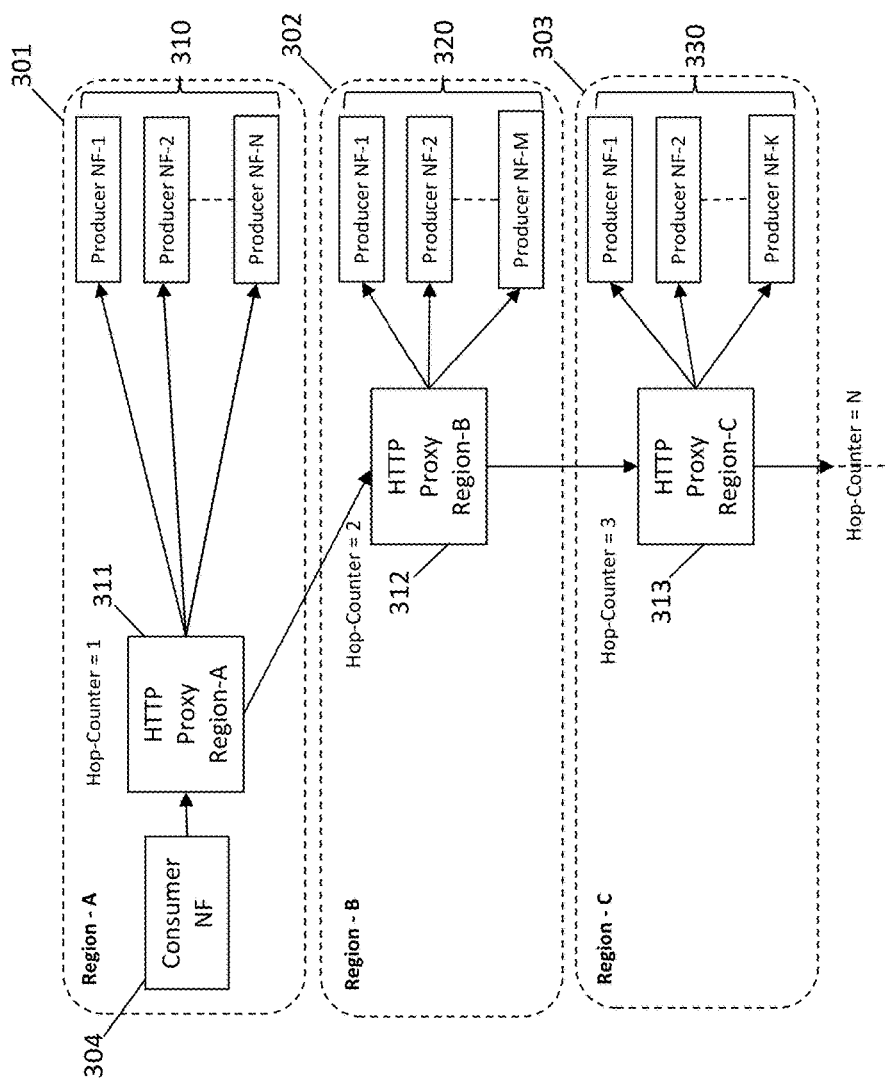
FIG. 3 is a block diagram illustrating an HTTP proxy forwarding a service based interface (SBI) message to other HTTP proxy servers under normal conditions.

Prior to describing the disclosed subject matter, a scenario of a common network flow processing executed by an HTTP proxy server is presented herein. For example, FIG. 3 is a block diagram illustrating an HTTP proxy server forwarding an SBI message to other HTTP proxy servers under normal conditions. In particular, FIG. 3 depicts a plurality of area regions 301-303 that are interconnected via HTTP proxy servers 311-313. In some embodiments, regions 301-303 can comprise geographic regions, PLMNs, or the like. Further, HTTP proxy servers 311-313 include SCPs, SEPs, or other similar proxy elements. In one scenario, a consumer NF 304 located in region 301 (e.g., "Region A") is attempting to connect to one or more of producer NFs 310 (e.g., producer NFs 1-N) in order to request the processing of a network service. In the scenario where the consumer NF's initial attempt to communicate with one or more of producer NFs 310 fails, local HTTP proxy server 311 may need to locate a designated producer NF positioned in another region. For example, if consumer NF 304 is connected to the immediate HTTP proxy server 311 (e.g., an SEP), HTTP proxy server 311 will first attempt to contact local producer NFs 310 (i.e., producer NFs 1-N) in region 301.

If these producer NFs cannot be reached (e.g., producer NFs are disabled or otherwise unavailable), HTTP proxy server 311 will attempt to communicate with the producer NFs in region 302 via HTTP proxy server 312. Specifically, HTTP proxy 311 initially forwards the SBI message to HTTP proxy server 312, wherein the header of the SBI message includes a Hop-Counter value set to '1'. Upon receiving the SBI message, HTTP proxy server 312 increases the Hop-Counter value in the SBI message header by one increment (e.g., Hop-Counter is increased to "2" as shown in FIG. 3). HTTP proxy server 312 will then attempt to connect to one or more of producer NFs 320 (e.g., producer NFs 1-M) in local region 302. If HTTP proxy server 312 cannot reach a producer NF in region 302, the SBI message is forwarded by HTTP proxy server 312 to HTTP proxy server 313 in region 303. Likewise, HTTP proxy server 313 will increment the Hop-Counter value in the request message header by one (e.g., increase value from '2' to '3') upon receiving the SBI message. Notably, HTTP proxy servers are currently configured to continuously forward the SBI message to other HTTP proxy servers until a producer NF that can provide service to the NF consumer is located.

In particular, there is no limit on the number of HTTP proxy servers that the SBI message can traverse. While the 3GPP specifications do define certain timers (e.g., 3GPP-SBI-Max-Rsp-Time and 3GPP-SBI-Sender-Timestamp) to assist with controlling the production and routing of unnecessary network traffic, these mechanisms only control the amount of time in which the request and/or response message should arrive. While an SBI message may have actually timed out while being processed by the first few initial HTTP proxy servers, the request may still be unnecessarily forwarded while an existing chain of HTTP proxy servers remains. More specifically, this process of forwarding an SBI message to different HTTP proxy servers can continue even after timestamp expiration measures for the message have expired.

At present, there is no mechanism defined by 3GPP or otherwise that limits the number of hops after one or more of the timeout mechanisms has expired or elapsed. Accordingly, such a configuration can needlessly generate network traffic among HTTP proxy servers while the SBI request has already timed out much earlier.

As such, this scenario will lead to significant problems since 3GPP defined HTTP proxy servers, which are required to attempt to identify alternative routes to alternative producer NFs, are configured to keep trying indefinitely until the chain of HTTP proxy servers comes to an end or the 3GPP-SBI-Max-Rsp-Time and 3GPP-SBI-Sender-Timestamp headers fail validation at an HTTP proxy server, whichever is earlier.

Figure 4:
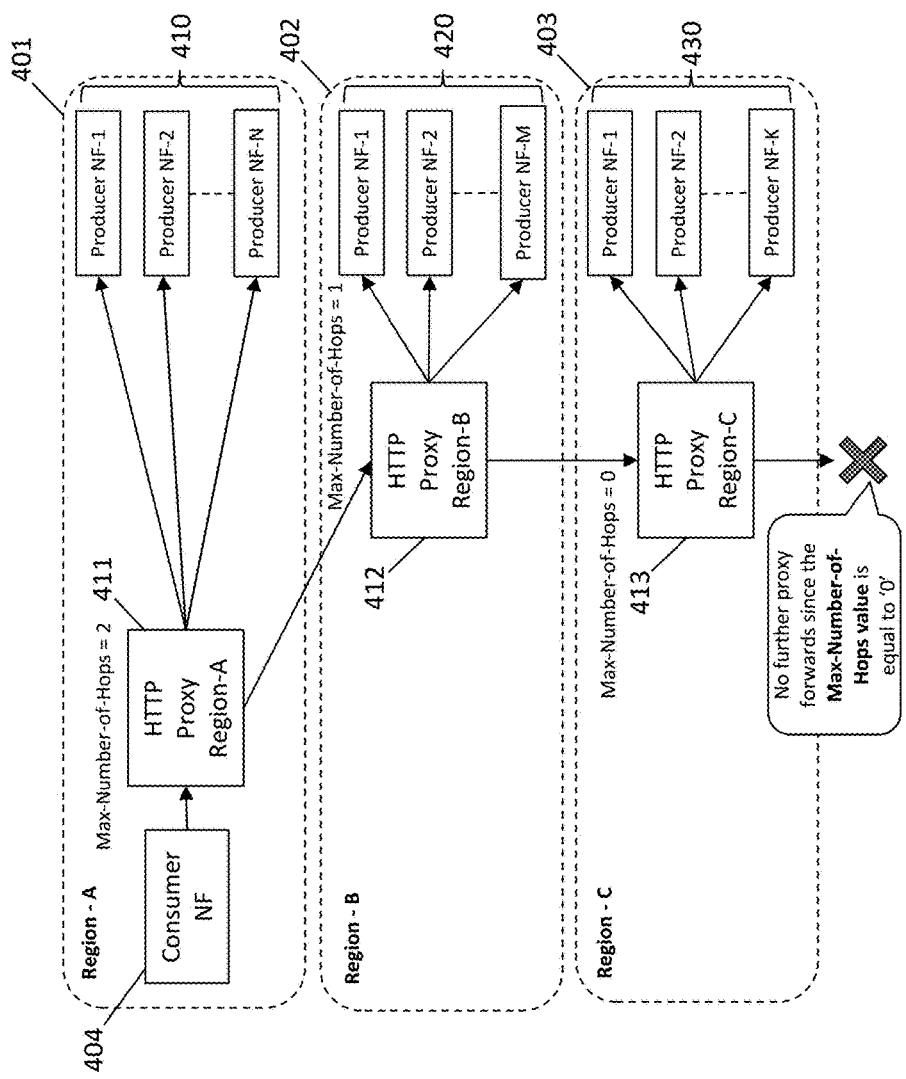
FIG. 4 is a block diagram illustrating an HTTP proxy configured with the disclosed subject matter that is capable of forwarding an SBI message to other HTTP proxy servers under specified conditions according to an embodiment of the subject matter described herein.

With the advent of 5G networks, the need to make decisions more rapidly is all the more challenging. FIG. 4 is a block diagram illustrating an HTTP proxy server configured with an HMM (as described above and in FIG. 2) that is capable of forwarding an SBI message to other HTTP proxy servers under specified conditions according to an embodiment of the subject matter described herein. As indicated above, the disclosed subject matter includes a mechanism that utilizes a packet header at the underlying HTTP protocol to restrict the number of hops in which the SBI message is communicated among HTTP proxy servers that are respectively located in a plurality of service regions (e.g., PLMNs and/or separate countries). In other embodiments, the disclosed subject matter can utilize a custom header to restrict the number of hops communicated among the HTTP proxy servers. However, utilization of a custom header (e.g., "X-number-of-hops") can pose a challenge since several network entities may not be configured to recognize or parse a particular custom header.

In some embodiments, a consumer NF can specify a maximum number of hops when the SBI message is generated and/or initiated. For example, a threshold value that indicates the maximum number of hops can be designated in the header of the SBI message by a consumer NF. More specifically, the threshold value can specify a maximum number of hops in which supporting HTTP proxy servers must comply. Thus, each time the SBI message arrives at an HTTP proxy server, that HTTP proxy is configured to decrement or subtract the current designated/indicated maximum number of hops by one. For example, if the maximum hop count is set at '2', a maximum of two HTTP proxy servers can relay the SBI message to other proxy servers. In the event the maximum number of hops in the header section reaches a value of zero, the receiving HTTP proxy server will drop (i.e., cease forwarding) the SBI message. In some embodiments, the HTTP proxy server can also be configured to generate an error message indicating a timed out error or service retry. The error message can then be directed to the original consumer NF that initiated the SBI message.

Referencing to FIG. 4, a network administrator may designate the maximum number of hops equal to "2" for SBI messages originating at consumer NF 404. For example, consumer NF 404 can set the value of "Max-Number-of-Hops" to a certain value (e.g., "2") in the header of the SBI message either by configuration or through a fixed value. Afterwards, consumer NF 404 can initiate and send the SBI message to HTTP proxy server 411, which is configured to locate a producer NF to provide a request network service to consumer NF 404.

If an available producer NF 410 (e.g., one of producer NFs 1-N) is unavailable and/or cannot be identified/found, HTTP proxy server 411 is configured to forward the SBI message to HTTP proxy server 412, which is located in an adjacent region 402. Specifically, HTTP proxy server 411 (and/or HMM) is configured to first inspect the header of the SBI message to determine the Max-Number-of-Hops value. If the maximum number of hops value in the header is set to '0', then HTTP proxy server 411 would drop the SBI message. However, in this example shown in FIG. 4, the maximum number of hops value is determined to be "2". After determining the maximum number of hops value in the header of the SBI message is not equal to zero, HTTP proxy server 411 is configured to reduce the Max-Number-of-Hops value by one (e.g., reduce to value '2' to '1'). Afterwards, HTTP proxy server 411 sends the SBI message to HTTP proxy server 412. Notably, intermediate HTTP proxy servers can reduce the value by "1" when forwarding the SBI message to the next entity (as described below).

After receiving the updated SBI message, HTTP proxy server 412 is configured to locate an available producer NF among producers 420 (e.g., producer NFs 1 . . . . M) in region 402. If a producer NF cannot be found (or is unavailable) in region 402, HTTP proxy server 412 is configured to forward the SBI message to HTTP proxy server 413 in region 403. Notably, HTTP proxy server 412 is configured to parse/inspect the header section of the SBI message to determine the Max-Number-of-Hops value. If the maximum number of hops value in the header is set to '0', then HTTP proxy server 412 is configured to drop the SBI message. However, in this example shown in FIG. 4, the maximum number of hops value is determined by HTTP proxy server 412 to be set to "1". After determining the maximum number of hops value in the header of the SBI message is not equal to zero, HTTP proxy server 412 is configured to reduce the Max-Number-of-Hops value by one (e.g., reduce to value '1' to '0'). Afterwards, HTTP proxy server 412 sends the SBI message to HTTP proxy server 413 in region 403.

After receiving the updated SBI message from HTTP proxy server 412, HTTP proxy server 413 is configured to locate an available producer NF among producers 430 (e.g., producer NFs 1 . . . . K) in region 403. If a producer NF cannot be found (or is unavailable) in region 403, HTTP proxy server 413 is configured to forward the SBI message to yet another HTTP proxy server in a separate region. As such, HTTP proxy server 413 is configured to parse/inspect the header section of the SBI message to determine the Max-Number-of-Hops value. In this example, HTTP proxy server 413 is determines that the maximum number of hops value in the header of the SBI message is set to '0'. In response, HTTP proxy server 413 is configured to cease the forwarding process and drop the SBI message. Further, HTTP proxy server 413 can be configured to send an error message and/or fail the message back to the original sending consumer NF.

In some embodiments, when 5G proxy servers, such as SCP and SEPP, are attempting alternate routing in response to receiving failure responses from producer NFs, the Max-Number-of-Hops count will be helpful in reducing the number of retries and or reroutes that the SBI message can be subjected to. In some embodiments, HTTP proxy servers can also be configured to modify the Max-Number-of-Hops value to a higher value if the HTTP proxy server deems that the increase is warranted for any reason.

Figure 5:
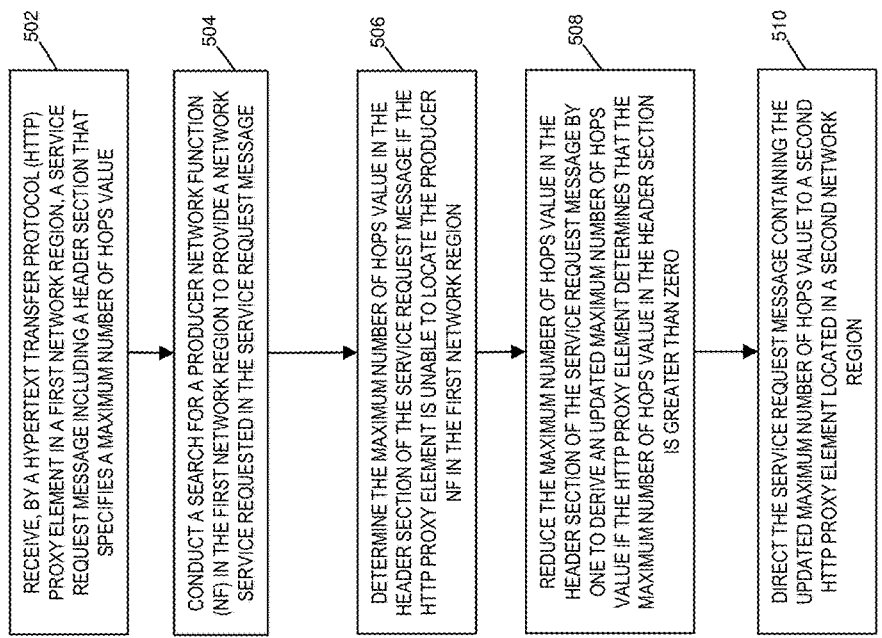
FIG. 5 is a flow chart illustrating an exemplary process for restricting a number of hops conducted in a communications network.

FIG. 5 is a flow chart illustrating an example process for sharing key ID and public certificate data for access token verification according to an embodiment of the subject matter described herein. In some embodiments, method 500 depicted in FIG. 5 is an algorithm, program, or script (e.g., a hop management module as shown in FIG. 2) stored in memory that when executed by a processor performs the steps recited in blocks 502-510. In some embodiments, the method 500 represents a list of steps (or changes in steps) embodied in a state machine (e.g., either via software code programming or via a set of rules) and/or logic of the HTTP proxy element and/or the hop management module (HMM).

In block 502, receiving, by a HTTP proxy element in a first network region, a service request message including a header section that specifies a maximum number of hops value. In some embodiments, an HTTP proxy server receives an SBI message from a consumer NF that includes a header section specifying a maximum number of hops value.

In block 504, conducting a search for a producer network function (NF) in the first network region to provide a network service requested in the service request message. In some embodiments, the HTTP proxy server attempts to locate a producer NF in the local region to service the consumer NF's requested network service.

In block 506, determining the maximum number of hops value in the header section of the service request message if the HTTP proxy element is unable to locate the producer NF in the first network region. In some embodiments, the HTTP proxy server is unable to locate a producer NF to provide the requested service to the consumer NF. In such a scenario, the HTTP proxy server is configured to forward the service request message to another HTTP proxy server located in a second network region that is geographically separate from the first network region.

In block 508, reducing the maximum number of hops value in the header section of the service request message by one to derive an updated maximum number of hops value if the HTTP proxy element determines that the maximum number of hops value in the header section is greater than zero. In some embodiments, the HTTP proxy server determines the maximum number of hops value contained in the header section of the service request message is greater than zero. If so, the HTTP proxy server reduces the maximum number of hops value in the header section by one. If the HTTP proxy server determined that the maximum number of hops value contained in the header section of the service request message is equal to zero, the HTTP proxy server would drop the message and/or send an error message to the original consumer NF making the service request.

In block 510, directing the service request message containing the updated maximum number of hops value to a second HTTP proxy device located in a second network region. In some embodiments, the HTTP proxy server is configured to forward the service request message with the updated maximum number of hops value to the second HTTP proxy server in the second network region for processing.

It should be noted that the HMM and/or functionality described herein may constitute or be facilitated by a special purpose computing device. Further, the HNN and/or functionality described herein can improve the technological field of managing SBI related network traffic by implementing a maximum number of hop counter value in a packet header. Implementation of the same reduces the decision-making time at the HTTP proxy servers, thereby resulting in improved network and resource utilization.

The disclosure of each of the following references is incorporated herein by reference in its entirety.

REFERENCES 1. 3$^{rd}$ Generation Partnership Project; Technical Specification Group Core Network and Terminals; 5G System; Network Function Repository Services; Stage 3 (Release 17) 3GPP TS 29.510 V17.3.0 (2021-09)
2. 3$^{rd}$ Generation Partnership Project; Technical Specification Group Services and System Aspects; Technical Realization of Service Based Architecture; Stage 3 (Release 16) 3GPP TS 29.500 V16.5.0 (2020-11)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for restricting a number of hops conducted in a communications network, the method comprising:
    receiving, by a hypertext transfer protocol (HTTP) proxy element in a first network region, a service request message including a header section that specifies a maximum number of hops value;
    conducting a search for a producer network function (NF) in the first network region to provide a network service requested in the service request message;
    determining the maximum number of hops value in the header section of the service request message if the HTTP proxy element is unable to locate the producer NF in the first network region, the first network region being a first PLMN;
    reducing the maximum number of hops value in the header section of the service request message by one to derive an updated maximum number of hops value if the HTTP proxy element determines that the maximum number of hops value in the header section is greater than zero; and
    directing the service request message containing the updated maximum number of hops value to a second HTTP proxy element located in a second network region, the second network region being a second PLMN different than the first PLMN;
    wherein each of the HTTP proxy element and the second HTTP proxy element is a security edge protection proxy (SEPP) or a service communication proxy (SCP).

2. The method of claim 1 wherein the service request message is a service based interface (SBI) message.

3. The method of claim 1 wherein the maximum number of hops value is initially established in the service request message by a consumer NF or established via a predefined default value.

4. The method of claim 1 wherein the service request message is prevented from being forwarded to the second HTTP proxy element in the second network region if the maximum number of hops value in the header section of the service request message is determined to be zero.

5. The method of claim 1 wherein the HTTP proxy element is configured to increase the maximum number of hops value in the header section or the updated maximum number of hops value in the header section.

6. The method of claim 1 wherein each of the first network region and the second network region is a geographically defined region.

7. A system comprising:
    a hypertext transfer protocol (HTTP) proxy element including at least one processor and a memory; and
    a hop management module (HMM) implemented by the at least one processor configured for
    receiving, by a hypertext transfer protocol (HTTP) proxy element in a first network region, a service request message including a header section that specifies a maximum number of hops value;
    conducting a search for a producer network function (NF) in the first network region to provide a network service requested in the service request message;

determining the maximum number of hops value in the header section of the service request message if the HTTP proxy element is unable to locate the producer NF in the first network region, the first network region being a first a Public Land Mobile Network (PLMN);

reducing the maximum number of hops value in the header section of the service request message by one to derive an updated maximum number of hops value if the HTTP proxy element determines that the maximum number of hops value in the header section is greater than zero; and directing the service request message containing the updated maximum number of hops value to a second HTTP proxy element located in a second network region, the second region being a second PLMN different from the first PLMN;

wherein each of the HTTP proxy element and the second HTTP proxy element is a security edge protection proxy (SEPP) or a service communication proxy (SCP).

8. The system of claim 7 wherein the service request message is a service based interface (SBI) message.

9. The system of claim 7 wherein the maximum number of hops value is initially established in the service request message by a consumer NF or established via a predefined default value.

10. The system of claim 7 wherein the service request message is prevented from being forwarded to the second HTTP proxy element in the second network region if the maximum number of hops value in the header section of the service request message is determined to be zero.

11. The system of claim 7 wherein the HTTP proxy element is configured to increase the maximum number of hops value in the header section or the updated maximum number of hops value in the header section.

12. The system of claim 7 wherein each of the first network region and the second network region is a geographically defined region.

13. One or more non-transitory computer readable media having stored thereon executable instructions that when executed by at least one processor of a computer cause the computer to perform steps comprising:

receiving, by a hypertext transfer protocol (HTTP) proxy element in a first network region, a service request message including a header section that specifies a maximum number of hops value;

conducting a search for a producer network function (NF) in the first network region to provide a network service requested in the service request message;

determining the maximum number of hops value in the header section of the service request message if the HTTP proxy element is unable to locate the producer NF in the first network region, the first network region being a first a Public Land Mobile Network (PLMN);

reducing the maximum number of hops value in the header section of the service request message by one to derive an updated maximum number of hops value if the HTTP proxy element determines that the maximum number of hops value in the header section is greater than zero; and directing the service request message containing the updated maximum number of hops value to a second HTTP proxy element located in a second network region, the second network region being a second PLMN different than the first PLMN;

wherein each of the HTTP proxy element and the second HTTP proxy element is a security edqe protection proxy (3EPP) or a service communication proxy (SCP).

14. The one or more non-transitory computer readable media of claim 13 wherein the service request message is a service based interface (SBI) message.

15. The one or more non-transitory computer readable media of claim 13 wherein the maximum number of hops value is initially established in the service request message by a consumer NF or established via a predefined default value.

16. The one or more non-transitory computer readable media of claim 13 wherein the service request message is prevented from being forwarded to the second HTTP proxy element in the second network region if the maximum number of hops value in the header section of the service request message is determined to be zero.

17. The one or more non-transitory computer readable media of claim 13 wherein the HTTP proxy element is configured to increase the maximum number of hops value in the header section or the updated maximum number of hops value in the header section.

\* \* \* \* \*

UNITED STATES PATENT AND TRADEMARK OFFICE
CERTIFICATE OF CORRECTION

PATENT NO. : 12,218,825 B2
APPLICATION NO. : 17/539724
DATED : February 4, 2025
INVENTOR(S) : Goel et al.

Page 1 of 1

It is certified that error appears in the above-identified patent and that said Letters Patent is hereby corrected as shown below:

In the Specification

In Column 8, Line 51, delete "and or" and insert -- and/or --, therefor.

In Column 9, Line 65, delete "(2021-09)" and insert -- (2021-09). --, therefor.

In Column 10, Line 2, delete "(2020-11)" and insert -- (2020-11). --, therefor.

In the Claims

In Column 11, Line 15, in Claim 7, after "the second" insert -- network --, therefor.

In Column 12, Line 23, in Claim 13, delete "edqe" and insert -- edge --, therefor.

In Column 12, Line 24, in Claim 13, delete "(3EPP)" and insert -- (SEPP) --, therefor.

Signed and Sealed this
Sixth Day of May, 2025

Coke Morgan Stewart
*Acting Director of the United States Patent and Trademark Office*